(12) United States Patent
Morselli et al.

(10) Patent No.: US 9,469,340 B2
(45) Date of Patent: Oct. 18, 2016

(54) STEERABLE VEHICLE

(75) Inventors: Riccardo Morselli, San Vito di Spilamberto (IT); Francesco Canuto, Turin (IT); Patrizio Turco, Bruino (IT); Enrico Raffone, Rivalta di Torino (IT)

(73) Assignee: CNH Industrial America LLC, New Holland, PA (US)

( * ) Notice: Subject to any disclaimer, the term of this patent is extended or adjusted under 35 U.S.C. 154(b) by 255 days.

(21) Appl. No.: 14/342,956

(22) PCT Filed: Sep. 3, 2012

(86) PCT No.: PCT/EP2012/067082
§ 371 (c)(1),
(2), (4) Date: Jul. 11, 2014

(87) PCT Pub. No.: WO2013/034514
PCT Pub. Date: Mar. 14, 2013

(65) Prior Publication Data
US 2014/0311814 A1 Oct. 23, 2014

(30) Foreign Application Priority Data

Sep. 7, 2011 (IT) ................. TO11A0795

(51) Int. Cl.
*B62D 6/00* (2006.01)
*B62D 1/22* (2006.01)
*B62D 5/04* (2006.01)
*B62D 5/093* (2006.01)

(52) U.S. Cl.
CPC ................ *B62D 6/007* (2013.01); *B62D 1/22* (2013.01); *B62D 5/0463* (2013.01); *B62D 5/093* (2013.01)

(58) Field of Classification Search
CPC ............ B62D 5/30; B62D 6/00; B62D 6/07; B62D 5/04; B62D 5/00; B62D 1/22; B62D 5/12; A01B 69/00; A01B 69/04
USPC ....... 180/167, 401, 405–407, 443, 444, 445; 56/10.2 A, DIG. 15
See application file for complete search history.

(56) References Cited

U.S. PATENT DOCUMENTS

| | | | | |
|---|---|---|---|---|
| 6,053,274 A | * | 4/2000 | Ehara ..................... | B62D 1/163 180/400 |
| 6,556,909 B2 | * | 4/2003 | Matsumoto ............ | B62D 7/159 180/204 |
| 6,612,393 B2 | * | 9/2003 | Bohner ................... | B62D 5/06 180/402 |

(Continued)

FOREIGN PATENT DOCUMENTS

| | | | |
|---|---|---|---|
| DE | 4225316 | * | 9/1993 |
| DE | 102004051194 | * | 4/2006 |

(Continued)

*Primary Examiner* — Anne Marie Boehler
(74) *Attorney, Agent, or Firm* — Rickard K. DeMille

(57) ABSTRACT

A steerable, self-propelled vehicle (20) includes a rotatable steering column that is connected to control the steering angle of one or more ground-engaging members of the vehicle. The vehicle includes between the steering column and the ground-engaging member a first steering servomechanism having at least a first steering assistance characteristic; a second steering servomechanism having a second steering assistance characteristic also being connected to act on the steering column. A controller is provided for causing the first and second steering assistance characteristics to influence the steering of the vehicle in dependence on one or more one or more control commands generated in the controller.

8 Claims, 9 Drawing Sheets

(56) References Cited

U.S. PATENT DOCUMENTS

| | | | | |
|---|---|---|---|---|
| 7,574,290 B2* | 8/2009 | Gibson | | A01B 69/008 177/2 |
| 7,942,230 B2* | 5/2011 | Kogel | | B62D 5/12 180/403 |
| 9,022,167 B2* | 5/2015 | Park | | B62D 5/065 180/405 |
| 2005/0257987 A1* | 11/2005 | Bohm | | B62D 5/0472 180/419 |
| 2007/0162822 A1* | 7/2007 | Choi | | H03M 13/116 714/758 |
| 2008/0053740 A1* | 3/2008 | Hublart | | B62D 3/14 180/406 |
| 2009/0312911 A1* | 12/2009 | Matthews | | B62D 6/002 701/42 |
| 2010/0071988 A1* | 3/2010 | Szabela | | B62D 5/008 180/446 |
| 2010/0152971 A1* | 6/2010 | Shiino | | B62D 5/0463 701/41 |

FOREIGN PATENT DOCUMENTS

| | | | |
|---|---|---|---|
| DE | 102007012392 | * | 10/2007 |
| DE | 102008051692 | * | 6/2009 |
| JP | 2008174194 | * | 7/2008 |

* cited by examiner

US 9,469,340 B2

STEERABLE VEHICLE

CROSS REFERENCE TO RELATED APPLICATIONS

This application is the US National Stage filing of International Application Serial No. PCT/EP2012/067082, entitled "A STEERABLE VEHICLE" filed Sep. 3, 2012, which claims priority to Italian Application Serial No. TO2011A000795, filed Sep. 7, 2011, each of which is incorporated by reference herein in its entirety for all purposes.

FIELD OF THE INVENTION

This invention relates to a steerable, preferably driver-operated, self-propelled vehicle. In particular the invention relates to a relatively heavy vehicle that is required to perform differing manoeuvres on a variety of types of surface. The invention therefore is applicable e.g. to construction vehicles such as excavators, bulldozers and back-hoe loaders; certain classes of military vehicle; and agricultural vehicles such as tractors, in respect of which the invention is most strongly applicable; farm loaders/grabs; and multipurpose vehicles (i.e. a pick-up-type vehicle having a forward cab, a pick-up deck, a four wheel drive powertrain equipped with off-road tyres and a low ratio transfer box permitting the towing of agricultural implements).

BACKGROUND OF THE INVENTION

It is well known to provide power assistance to the steering sub-systems of driver-operated vehicles.

In various types of vehicle it has for many years been commonplace, especially in the case of relatively large vehicles in which the required steering effort may be significant, to provide power assistance in the form of a hydraulic servomechanism. This includes a pump for pressurising a fluid such as hydraulic oil in a circuit that includes a servovalve. The degree of opening of the servovalve is determined by turning of the steering column, of the vehicle, that is coupled to an input shaft of the valve by way of a mechanical linkage.

The valve pilots the hydraulic fluid pressure, in dependence on the resulting valve setting, to an assist motor that in some applications is a linear hydraulic cylinder having at each end an extensible arm and in some other applications may be e.g. a hydrostatic motor.

The cylinder when fitted interconnects by way of the ends of the arms the steerable wheels of the vehicle in replacement of conventional, solid steering linkage members. The cylinder may act in the same manner as the rigid linkages or, when extension of the arms occurs as a result of operation of the servomechanism, to reduce the effort needed to turn the steering wheel against the resistance provided by the mass of the vehicle acting through the steerable wheels.

Power assistance of this general kind renders the feeling of the steering "light" (i.e. relatively effortless) as experienced by the driver of a vehicle equipped with it. Moreover if the servomechanism fails for any reason the cylinder becomes rigid and behaves in the same manner as a conventional linkage member. In consequence it remains possible to steer the vehicle, albeit through the application of considerably more effort on the part of the driver, in the event of a servomechanism fault developing.

One characteristic of hydraulic servomechanisms of the general kind described above however is that they do not on their own provide a "self-centring" characteristic. This is of course important in most self-propelled, driver-controlled vehicles since it is strongly desirable that the steerable wheels return to a "straight ahead" setting in the event of the driver releasing a steering input member (that in a passenger car and the majority of the vehicle types listed is a steering wheel).

Passenger vehicle steering is normally designed to incorporate a positive caster angle that gives rise to a mechanical self-centring effect. This tends to provide directional stability when the vehicle is driven on relatively smooth, metalled roads as is normally the case for such a vehicle.

A self-centring steering effect is of limited benefit in the case of agricultural vehicles when they are operating in off-road situations such as when driving in fields.

This is partly because furrows or other features of e.g. a ploughed field tend to override any self-centring effect brought about through design features including positive camber angles. The forces induced by the furrows on the steerable wheels (or other ground-engaging members of the tractor, if fitted) exceed any self-centring forces induced by the steering geometry.

Moreover under many circumstances when operating in a field a tractor operator may find a self-centring effect to be inconvenient. Examples arise when turning at a headland, or when following a curved margin of a field, when driving on lateral slopes (in a so-called "crab-like motion"), or when ploughing with two wheels in a furrow.

At such times it may be desirable in effect to "set" a steering angle for an extended period of operation. The tractor driver therefore may find it bothersome to have to adjust the steering input member continuously in order to overcome a self-centring effect and assure constancy of the steering angle.

In any event a modern tractor is a complicated multi-purpose vehicle that may be fitted with or coupled to numerous sub-systems (such as harvesters, spraying equipment and tilling implements) that require operation from within the operator's cab. When operating such sub-systems the driver may find it very difficult simultaneously to make steering input adjustments.

On the other hand when moving in a straight line on a relatively flat field, or when driving on roads, a tractor operator may find it desirable for the tractor to behave in ways that are similar to other road vehicles, and thereby exhibit a self-centring steering effect or other effects that are useful from the standpoints of safety, stability and/or convenience.

Another known type of power steering assistance mechanism is an electric type, in which rotations of the steering column are converted (e.g. using a Hall effect device, or another kind of sensor) into electrical signals. These in turn may be used to generate commands for an electric motor that is connected to provide rotational assistance forces to the steering column. Indeed in some arrangements the shaft of the steering column itself is constituted over part of its length as the rotor of the motor.

It would be desirable to be able to adjust the characteristics of the steering of a large, heavy vehicle that operates under varying circumstances, to take account of the prevailing type of use. The presence or absence of a self-centring steering effect is exemplary of the kind of characteristic it could be desirable to adjust, although there exist others such as but not limited to the degree of damping of the steering (i.e. the extent to which the steering deviates from a set steering angle); the extent to which power assistance applies to assist the vehicle operator; assistance in turning from one lock to the opposite lock as quickly as possible; and more general transitions of characteristics that take account of changes from rough off-road to on-road or smooth field driving.

SUMMARY OF THE INVENTION

The invention seeks to provide one or more advantages not available in existing power steering assistance. To this end according to the invention in a broad aspect there is provided a steerable, self-propelled vehicle including a steering mechanism having a rotatable steering column that is connected to control the steering angle of one or more ground-engaging members of the vehicle, the vehicle including acting on the steering mechanism at a first location (e.g. at an end of the steering column and lying between the steering column and the ground-engaging member) a first steering servomechanism having at least a first steering assistance characteristic; acting on the steering mechanism at a second location, e.g. part-way along its length a second steering servomechanism having a second steering assistance characteristic; and a controller for causing the first and second steering assistance characteristics to influence the steering of the vehicle in dependence on one or more driver inputs and/or one or more control commands generated in the controller.

The presence of two servomechanisms having differing assistance characteristics, together with a controller for determining the extent to which each of them confers its assistance characteristic(s) on the steering of the vehicle, means that it is possible to provide a wide variety of steering modes in the vehicle. These may be designed for example for when travelling in a ploughed field or on rutted ground, or for when travelling on smoother surfaces. A variety of other characteristic choice criteria may equally well form the basis for a design/control philosophy based on the invention as broadly stated.

By "connected" herein is meant a variety of ways of causing or permitting one component or sub-system to influence another. Thus for example the steering column may be connected to control the steering angle of the one or more ground-engaging members by way of a physical (mechanical) connection or an electronic connection involving servomotors and signal wires or wireless communication protocols. Another possibility is for the connection to be by way of fluid power components such as hydraulic or pneumatic circuits.

In preferred embodiments of the invention the vehicle is driver-operated, but as explained below this need not necessarily be the case.

Preferably the first steering servomechanism is a hydraulic steering servomechanism including a hydraulic steering valve that generates a pilot hydraulic signal in relation to the rotational angle of the steering column and at least one hydraulic steering cylinder connected to adjust the steering angle of the one or more ground-engaging members, the pilot hydraulic signal being piloted to control the hydraulic steering cylinder.

The first steering servomechanism therefore may in preferred embodiments of the invention be similar to known hydraulic power steering systems of the kind described above. Indeed it is possible within the scope of the invention to adapt known power steering hydraulic systems at low cost for use as the first servomechanism of the invention. In other embodiments of the invention however the first servomechanism may be of other designs.

Also preferably the second steering servomechanism is an electric power steering servomechanism including a motor for generating a torque (rotational force) that acts on the steering column; and a signal generator for generating control signals determining the magnitude and direction of action of the torque.

The use of an electric power steering servomechanism means that it is readily possible to provide, in the vehicle of the invention, a hybrid steering assistance arrangement in which the two servomechanisms have differing, yet readily combined, characteristics.

In like manner to the first servomechanism the second servomechanism may be of the kind described above, or may of another type as desired and depending on the precise application under consideration.

Conveniently the controller is programmable and the vehicle includes a human-machine interface (HMI) using which a driver may input commands selecting two or more programmed modes of operation of the steering servomechanism.

The HMI may be designed to provide for ease, and speed, of use, thereby minimising the extent to which a tractor driver must pay attention to the selection of steering assistance modes while performing difficult manoeuvres. To this end when the vehicle is an agricultural vehicle the HMI includes switching interfaces for selecting between programmed modes that control steering during movement of the tractor respectively in a field headland and in other locations.

Preferably the HMI includes respective switches for selecting the programmed modes and sequentially selecting sub-modes following selection of a said programmed mode. Thus in preferred embodiments of the invention the HMI may permit "scrolling" through a sequence of selectable modes in a manner that is extremely simple to achieve and that can be completed quickly.

Optionally and preferably the other locations include but are not limited to fields and roads.

In particularly preferred embodiments of the invention the sub-modes available following selection of headland operation include a damped steering sub-mode, a maximal assistance ("effortless") sub-mode, automatic steering centring sub-mode and a lock-to-lock assistance sub-mode as defined herein; and the sub-modes available following selection of other location operation include an on-road sub-mode, a damped steering sub-mode and a maximal assistance ("effortless") sub-mode as defined herein.

Conveniently the vehicle includes two or more selectively operable steering input members connected to the steering mechanism that are or include a steering wheel and a joystick. The invention therefore is suitable for use in an agricultural tractor or backhoe loader in which a joystick control is provided for the purpose of permitting a driver to steer the tractor when his seat is reversed and he/she is viewing operations of the vehicle via a rearwardly facing window of the operator cabin.

When present the steering wheel preferably is mechanically coupled to the steering column, although it is possible for the steering wheel to be an electronic input device that generates electrical signals instead of being directly physically coupled to the steering column. The joystick preferably is electronically coupled to the second steering servomechanism, although in certain embodiments of the invention it may be connected by way of a pneumatic or hydraulic movement mimic circuit, or even a mechanical linkage.

Although conventionally the phrase "steering column" refers to an elongate, shaft-like column that is rigid in normal use and extends from the forward bulkhead of the vehicle cab to connect to forwardly mounted steering linkage components, this need not necessarily be so in the case of the invention. Thus the steering system of the vehicle may operate principally on the basis of electronic commands (a so-called "steer-by-wire" arrangement) and the steering column may in that case need to be long enough only to journal a steering wheel relative to the cab fascia or dashboard. The first and second servomechanisms may be manufactured in such sizes and may be located on the steering column so as to accord with such a steering column design. The principal, operative part of a steering mechanism as defined below while referred to as a "steering column" may not be recognisable as such in the conventional sense; and need not be mounted relative to a fascia or dashboard as mentioned above. All such variations are within the scope of the invention.

Moreover the steering set-up of the vehicle may include parts and sub-systems that do not in the literal sense form part of a steering column. To this end herein the term "steering mechanism" is intended to embrace all mechanically, electrically, electronically or electro-mechanically connected arrangements that convert driver or other steering inputs into the steering action of ground engaging members.

In a further optional refinement the vehicle of the invention may include at least one receiver of transmitted vehicle guidance signals and at least one controller that converts received guidance signals to steering input commands that are input to the first steering servomechanism and/or the second steering servomechanism.

As a result the vehicle of the invention may be arranged to operate in accordance with a remote guidance regime.

As an example of such an arrangement on very large farms the directional guidance of tractors may occur on the basis of command signals transmitted from an orbiting satellite that in turn may contain stored within a memory device a map of the field in which a tractor operates. Such an automatically guided vehicle does not require the input of an operator at all when performing field tasks, and instead manoeuvres in dependence on data transmitted from the satellite and received by the vehicle-mounted signal receiver.

An arrangement of this kind could operate on the basis of "Global Positioning System" signals, or other signals created specifically for the farm in question.

Another example of use of a vehicle equipped with a signal receiver arises when performing operations such as ploughing or seeding in a very large field. In such a case if the field is of an essentially regular shape such as a rectangle a contractor may operate multiple tractors simultaneously in the field. As a result it may be possible to complete the field task very quickly (and thereby for example take advantage of favourable meteorological conditions, or the scheduling of use of the vehicles in question).

Since each of the tractors will complete essentially the same manoeuvres as the others, albeit in each case following a line displaced to one side or the other across the width of the field compared with an adjacent tractor, it is not necessary to provide a driver in the cab of each tractor. On the contrary it may be possible for only one, "command" tractor to be operated by a driver, and for the others in the group to be driverless.

The command tractor may operate under the control of the driver or on some other basis (such as an automated guidance regime) and may transmit guidance commands via a transmitter to the other vehicles in the group. The latter would receive the commands and generate control commands for one or both of the steering servomechanisms. As a result the driverless tractors could for example copy the manoeuvres of the "command" tractor, or could replicate them in a modified way that takes account of the lateral displacement or localised conditions in the portion of the field in which the driverless vehicles operate.

In yet a further variant all the tractors in a group could be driverless and could receive remotely generated guidance/steering commands. A supervisor could oversee operations of the tractors of the group from the edge of the field, or even from a remote location (using e.g. telemetry equipment such as video cameras coupled to transmitters and fitted to one or more of the tractors).

Preferably the amount of steering assistance is adjustable depending on at least one of the following signals:
vehicle speed or wheel speed
steering wheel angle
electric motor position (angle)
joystick position
steerable wheel alignment angle
torque on the steering column
hydraulic pressure in one or more hydraulic steering cylinder(s)
driver input torque on the steering wheel
electric motor supply current or voltage
guidance signals.

When referring to the alignment angle of steerable wheels in this context one may consider front steerable wheels (as are present in a conventional tractor); rear steerable wheels such as those commonly employed in a combine harvester; and/or an articulated vehicle frame arrangement, as used in a so-called bi-directional or articulated tractor, in which hydraulic cylinders cause articulation of front and rear parts of a vehicle frame. The invention is applicable to all such types of steering set-up; and references herein to "steerable wheels" and similar components should be construed accordingly.

BRIEF DESCRIPTION OF THE DRAWINGS

There now follows a description of preferred embodiments of the invention, by way of non-limiting example, with reference being made to the accompanying drawings in which.

DETAILED DESCRIPTION OF THE PREFERRED EMBODIMENT

Figure 1:
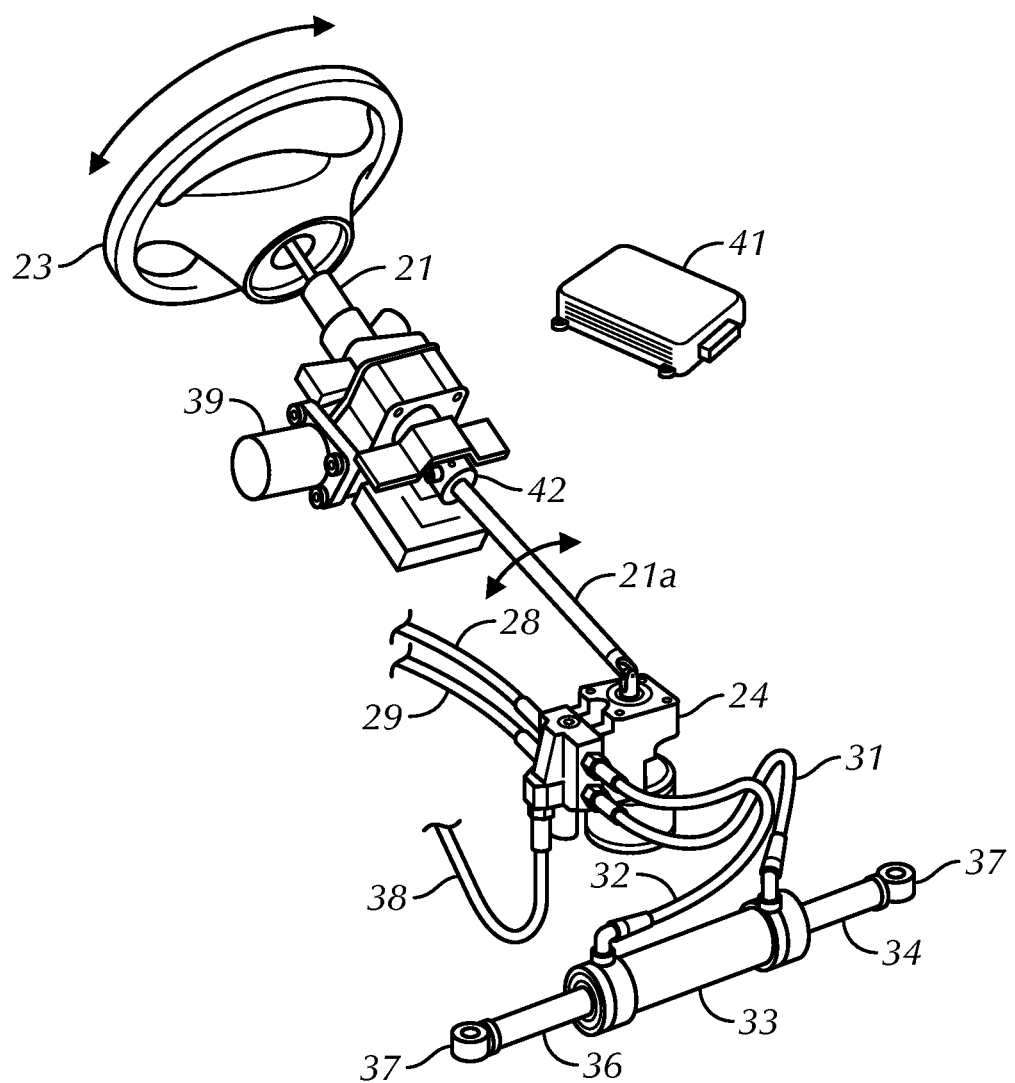
FIG. 1 is a schematic, perspective view of parts of a vehicle, according to the invention, embodying features as described herein.

Referring to the drawings a self-propelled vehicle in the form of a tractor 20 (FIGS. 3-8) according to the invention includes a rotatable steering column 21.

In the embodiment illustrated the steering column 21 takes the form of an elongate rod that over the major part of its length is solid and rigid.

The steering column 21 in the preferred embodiment shown interconnects at an upper end, inside the cab 22 of the tractor 20, a steering input member in the form of a conventional steering wheel 23 and at a lower end, inside the powertrain compartment of the tractor at its forward end, the control valve 24 of a hydraulic steering assistance sub-system that is described in more detail below.

In the majority of embodiments of the invention the steering wheel or another steering input member would be present, but it is possible to devise driverless versions of the vehicle of the invention in which it would not be strictly necessary to provide a steering input member. In practice however even in a version of the vehicle that is intended to be driverless a steering input member typically would be present in order to provide the option of driver-operation should this be desired.

The steering column 21 is journalled in one or more bearings at two or more locations along its length in order to permit it to rotate about its longitudinal axis. The bearings are omitted from FIG. 1 for ease of illustration, and may be of conventional designs.

The steering column 21 optionally may include any of a range of engineering features that are commonplace in such components. These include collapsible sections that absorb energy in the event of a crash accident, and articulated joints such as optional joint 42 that is visible in FIG. 1 permitting the transfer of rotational motion in a steering column that is not completely straight along its whole length.

Figure 5A:
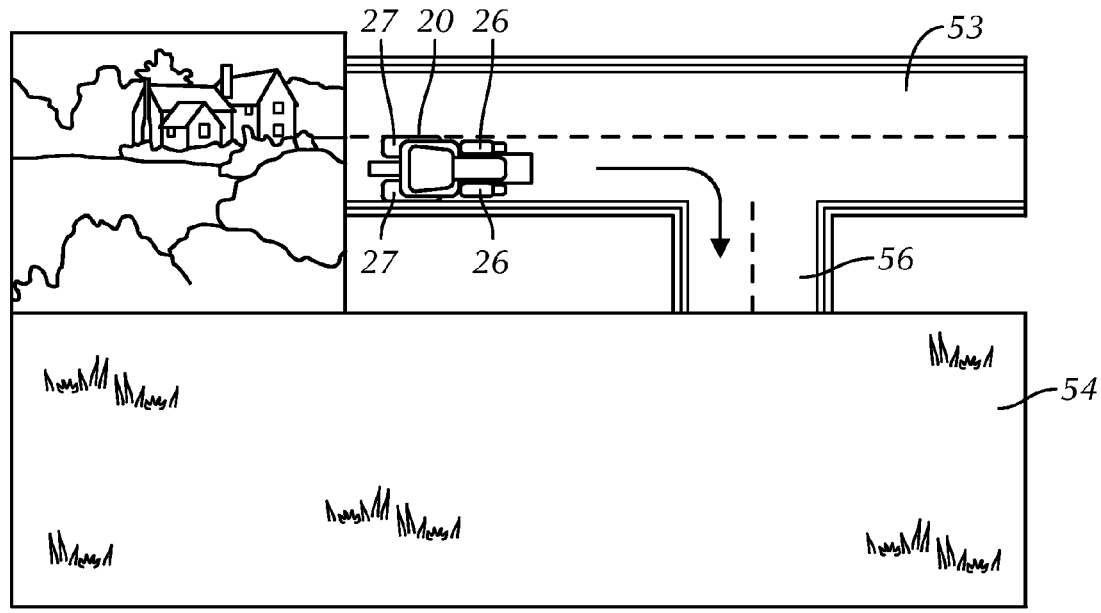
FIG. 5a shows in plan view from above an example of a first manoeuvre (passing from a road into a field) that may be performed by a tractor.

The tractor 20 includes in the embodiment shown four ground-engaging members in the form of pairs of front (26) and rear (27) wheels (FIG. 5a).

The front wheels 26 are steerable as a result of rotation of the steering column 21. To this end the steering column 21 is operatively connected at its forwardmost end 21a to a series of steering linkage members that constitute a steering mechanism.

The steering mechanism interconnects the steering column 21 and the front, steerable wheels 26 in a manner that converts rotational movement of the steering column 21 into rotations of the essentially upright wheels 26 about the caster (steering) axis that is a well known parameter of steerable wheel design.

The vehicle 20 of the invention includes a first steering servomechanism in the form of the hydraulic steering assistance sub-system mentioned above.

This sub-system includes the hydraulic control valve 24 that in the preferred embodiment of the invention is a double acting, bidirectional proportional valve having a rotary input to which the lowermost end 21a of the steering column 21 is secured such that rotation of the steering column 21 clockwise and anti-clockwise causes movement of e.g. a valve spool to either side of a centre (closed) position.

The valve 24 includes connected thereto in a per se known manner on an input side a pair of hydraulic feed lines 28, 29 that are in turn connected to output ports of a pump for pressurising hydraulic fluid (e.g. oil) in the circuit constituted by the valve 24 and related components.

On an output side valve 24 connects by way of further hydraulic feed lines 31, 32 to a double acting, hydraulic cylinder 33.

Cylinder 33 is as illustrated mounted securely in the vehicle 20 in an orientation that under normal use of the vehicle is horizontal. At each end the cylinder 33 includes a respective extensible steering linkage arm 34, 36.

Each of the linkage arms 34, 36 terminates at a free end in a rose joint 37 or a similar fixing by which it secures to the stub axle of one of the steerable front wheels 26.

Rotation of the steering column as stated moves the spool of valve 24 away from its centre position. This pilots pressurised hydraulic oil fed into the valve 24 via the lines 28, 29 in a manner causing simultaneous extension of one of the linkage arms 34, 36 outwardly from the cylinder 33 and retraction of the other to a location withdrawn inside the cylinder 33. This causes power-operated steering of the wheels 26 to occur, in a manner that is known per se.

The hydraulic steering assistance sub-system illustrated additionally includes return hydraulic fluid line 38 that interconnects the valve 24 and the pump for the purpose of recirculating hydraulic oil expelled from the cylinder 33 as a result of retraction of one or other of the linkage arms 34, 36.

As described above in the event of the first steering servomechanism ceasing to provide assistance the cylinder 33 in effect becomes a rigid transverse steering linkage member by reason of the trapping of a column of hydraulic fluid inside it. The cylinder therefore may transfer rotations of the steering column as steering movements of the wheels 26 even if e.g. the hydraulic fluid pump ceases operating.

The vehicle 20 of the invention also includes a second steering servomechanism in the form of an electric steering assistance sub-system constituted by a steering column rotary electric motor 39 and a controller in the form of an electronic control unit (ECU) 41.

The electric motor 39 in the embodiment shown is mounted with its axis of rotation extending transversely of the steering column 21. A pinion or other drive-transferring gear at the end of the output shaft of the motor engages a similar pinion that is connected to the steering column 21. Powered rotation of the output shaft causes powered assistance of the rotation of the steering column 21 in a per se known manner. The torque and the extent of rotation of the motor 39 are controlled in dependence on control commands generated in the ECU 41, that is operatively connected to the motor 39 e.g. by way of a CAN-BUS forming part of the control system of the tractor 20, or by any equivalent means.

The nature of the coupling between the output shaft of the motor 39 and the steering column 21 is such that in the event of the motor offering no assistance (for example if there is a component failure in the second steering servomechanism) rotation of the steering column 21 as a result of rotation of the steering wheel alone is not prevented.

The two servomechanisms described are associated with differing characteristics in terms of the steering assistance they provide.

Thus for example the hydraulic valve 24 and cylinder 33 amount to a so-called "non reactive" assistance sub-system.

By this is meant an arrangement in which the assistance force may be maintained at the same value regardless of the degree to which the steering wheel 23 is turned.

This means that considered on its own the first steering servomechanism of the vehicle of the invention does not provide any self-centring effect and instead is useful to maintain a constant steering angle. Thus in situations in which it is desired to steer a steady curve continuously with little or no driver input the controller (ECU) 41 of the invention may operate so that a relatively large proportion of the steering assistance power is provided by the hydraulic circuit constituting the first servomechanism, and a relatively small proportion by the second, electric servomechanism.

Similarly the first servomechanism described can provide a significant damping effect in the steering response of the vehicle (the degree of damping being inversely proportional to the tendency of the steering to be deflected e.g. by undulations in the surface on which the vehicle travels). Therefore when travelling in straight lines (for example when ploughing or sowing) again it may be desirable for the controller to ensure that a relatively large proportion of the assistance is provided by the hydraulic circuit constituting the first steering servomechanism.

It is possible to achieve a relatively low, or zero, proportion of assistance from the second, electric steering servomechanism by reducing the current supplied to the motor 39 in dependence on the signals generated in the controller (ECU) 41.

In other circumstances, such as when moving on roads, it may be preferable to increase the assistance provided by the second, electric steering servomechanism. It may be possible to devise embodiments of the invention in which adjustment of the relative amounts of steering assistance provided respectively by the first and second servomechanisms occurs by reducing the pump pressure seen at the actuator 33. In the preferred embodiments of the invention tested however the assistance provided by the first, hydraulic servomechanism remains constant while the amount of assistance provided by the second, electric servomechanism is adjusted as stated in order to produce the desired effects.

At yet other times it may be desirable to operate with maximal assistance provided by both the servomechanisms, such as when wishing to convert quickly from full right steering lock to full left steering lock (or vice versa).

Examples of some modes of assistance that are as a result possible include but are not limited to the following:

"Effortless" sub-mode: the electric motor 39 (first servomechanism) provides a torque that almost exactly compensates the friction forces on the steering column. Therefore with a very low input force requirement (or even zero or almost zero if desired) the driver can steer the vehicle.

"Lock-to-lock" sub mode: the driver provides an initial rotary force input motion to the steering wheel 23, and thereafter does not need to provide any further torque input. The electric motor 39 moves the front wheels until the lock position is reached at the constant speed given by the driver. The assistance interrupts immediately in the event of the driver again grasping the steering wheel.

"Go to centre mode": This is similar to the "lock-to-lock" sub-mode, but the front wheel alignment stops adjusting when the wheels reach a designated centre position.

Desirably therefore the vehicle 20 of the invention includes a means for selecting the degree of assistance offered by at least one of the servomechanisms (i.e. preferably the second, electric servomechanism) between a minimum level (that might represent no assistance at all, depending on the precise design of the vehicle and the servomechanisms) and a maximum representing a safe performance limit of the servomechanism.

One form that such a means may take is the human-machine interface (HMI) panel 43 shown in FIGS. 2, 3 and 5*b*-8*b*.

The HMI panel 43 may be of a wide variety of possible designs. The basic functions of the panel 43 are:
  selection of the steering assistance depending on the work condition (headland, field, road, etc.)
  selection of transition mode between different assistance levels (i.e. manual, related to the HTS (headland turning sequence) button; other vehicle functions; automatic)

The HMI by which selection of modes of operation, such as but not limited to those outlined above, may be made as stated can take a variety of forms. One desirable characteristic of such a panel when employed in an agricultural vehicle such as a tractor is that it is quick and simple to use. This is primarily for the reasons given above, namely that a tractor driver often must respond quickly to rapidly-changing circumstances while operating complicated sub-systems of a heavy, powerful vehicle. Simplicity and speed of operation therefore are often very important in the design of tractor sub-systems.

Also a tractor driver may have to work wearing gloves or other protective clothing that limits his dexterity. Ideally the panel 43 should be designed with such features in mind.

Different requirements however may arise in other types of vehicle, and for this reason among others the HMI panel 43 described herein is merely exemplary and is not limiting of the scope of the invention.

HMI panel 43 includes a pair of mode selection buttons 44, 46 that if desired may be secured in an accessory panel 47. Each button 44, 46 lies adjacent an array of sub-mode indicator lamps 44*a*, 44*b*, 44*c*, 44*d*, 46*a*, 46*b*, 46*c*, and beneath each button 44, 46 on the panel 47 is marked a respective legend indicating the circumstances under which a particular menu of steering assistance modes should be selected.

The legends shown are suitable for use in an agricultural tractor, and therefore read "HEADLAND" adjacent button 44 (which therefore is used to select steering assistance modes suitable for tractor turns in field headlands) and "FIELD/ROAD" adjacent button 46 (which therefore selects modes appropriate to driving on relatively smooth surfaces and/or when there is little need for significant turn assistance).

Each of the buttons is wired and/or is connected to ECU 41 such that pressing of one button 44, 46 automatically cancels any prevailing selection made using the other button. Each sequential press of one of the buttons causes the selection of the sub-modes indicated by the adjacent array of indicator lamps 44*a*-*d* or 46*a*-*c* in turn, such that the mode selection buttons may be used to "scroll" through the sequence of sub-modes until a desired sub-mode is selected.

The sub-mode indicator lamp of a selected sub-mode illuminates as selection occurs. An appropriate legend identifying each mode, as illustrated in FIG. 2, is marked adjacent each respective indicator lamp.

In addition to the foregoing, as described in more detail below, the selection of at least some modes may take place on an automatic basis.

Figure 2:
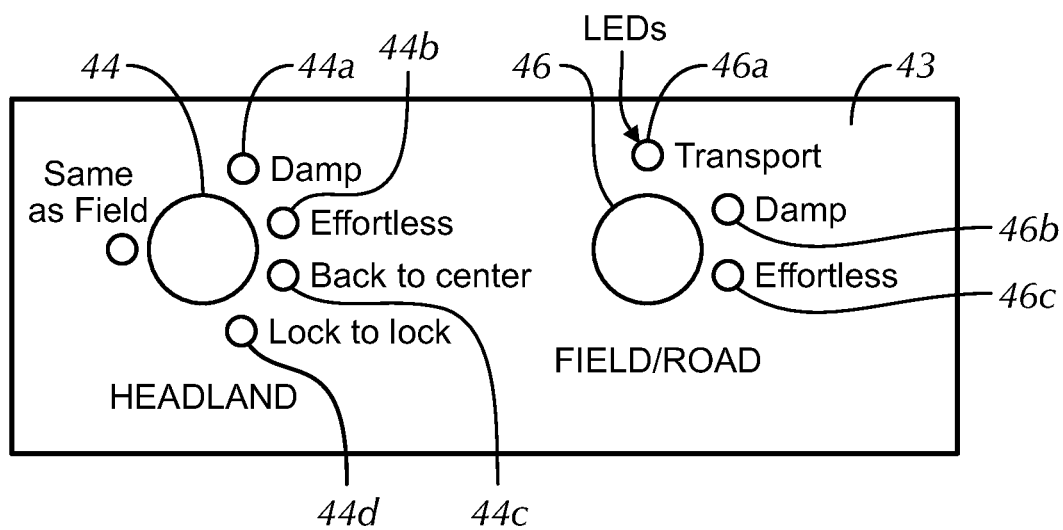
FIG. 2 shows an example of a "human-machine interface" (HMI) that is suitable for use in a vehicle according to the invention.
Figure 3:
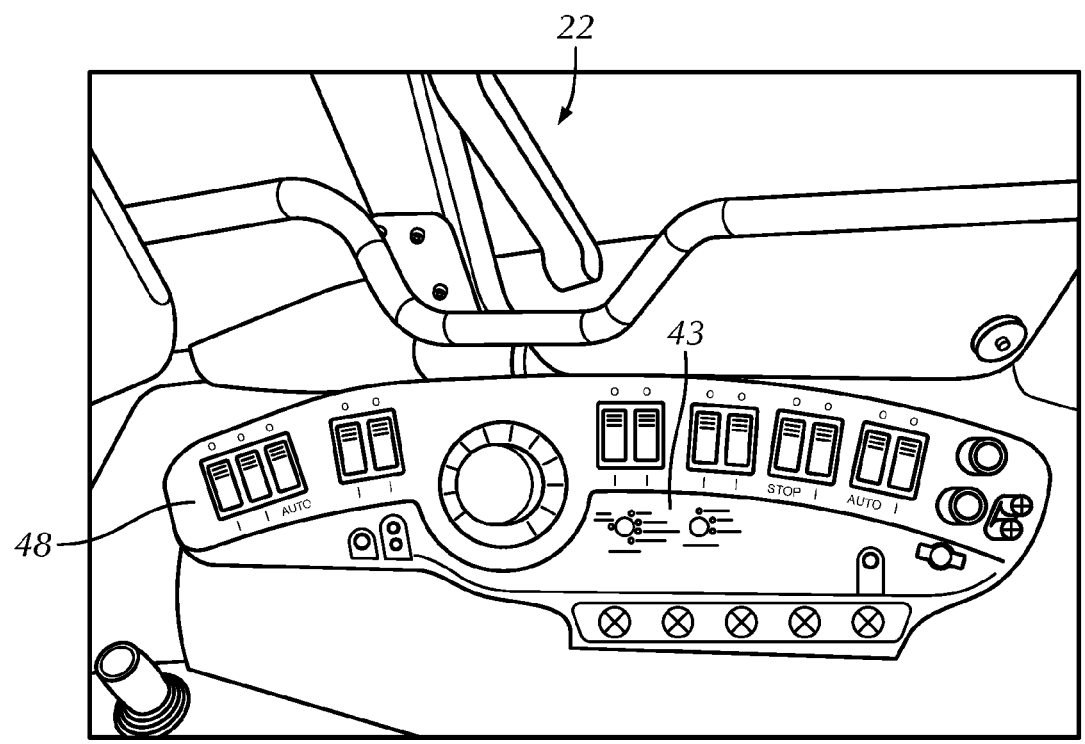
FIG. 3 is a perspective view showing the HMI of FIG. 2 installed in the cab fascia of an agricultural tractor.

FIG. 3 shows location of the HMI 43 of FIG. 2 in one exemplary position in the front dashboard 48 inside the cab 22 of a tractor 20. Other layouts and positions are of course possible within the scope of the invention and will vary from one design of vehicle to another.

Figure 4:
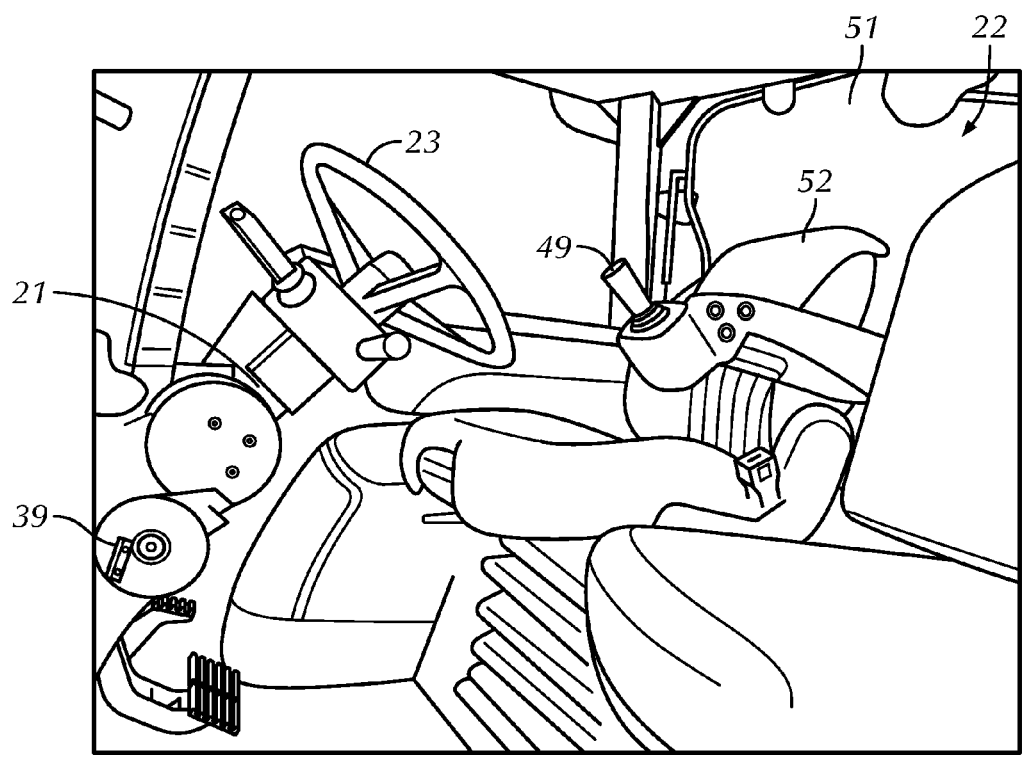
FIG. 4 is a perspective view showing the location in the cab of a tractor according to the invention of some further components forming part of the invention

FIG. 4 further illustrates one way, of many, in which certain components as described herein may be located in the vehicle cab 22.

FIG. 4 shows a vehicle steering wheel 23 in a conventional location. A shroud that normally obscures the parts of the steering column 21 that lie inside the cab 22 has been removed to show one possible location for the motor 39 forming part of the second steering servomechanism.

Also visible in FIG. 4 is a joystick 49 that is provided in certain tractor designs in order to provide control for various functions of the tractor 20.

The joystick is a second driver-operated steering input member that is electronically coupled and is configurable (e.g. as a result of pressing of an actuation button) to act as an input member via which the tractor operator may input steering commands.

The joystick is useful in particular when the vehicle operator is performing manoeuvres requiring him/her to look out of the rear window 51 of the cab 22. Controlling the steering of the tractor 20 is considerably easier at such a time when the joystick is used instead of the steering wheel 23. In some tractors 20 an operator's seat 52 is capable of swivelling to make it comfortable for the operator to control the tractor 20 while looking out of the rear window 51.

Referring now to FIGS. 5-8 a number of options are illustrated for selecting the sub-modes that are available in the exemplary tractor 20 described above. As indicated elsewhere herein, the list of sub-modes described and their grouping as sequences are not intended to be limiting of the invention, and many other combinations of sub-modes of steering control are possible.

In FIG. 5a the tractor 20 is shown travelling on a relatively smooth road surface 53 just before turning in to a field 54 via a field gateway 56 that marks a transition from one type of operation (driving on road) to another (e.g. spreading, spraying, seeding, ploughing, harrowing, rolling or otherwise treating the soil of the field).

Figure 5B:
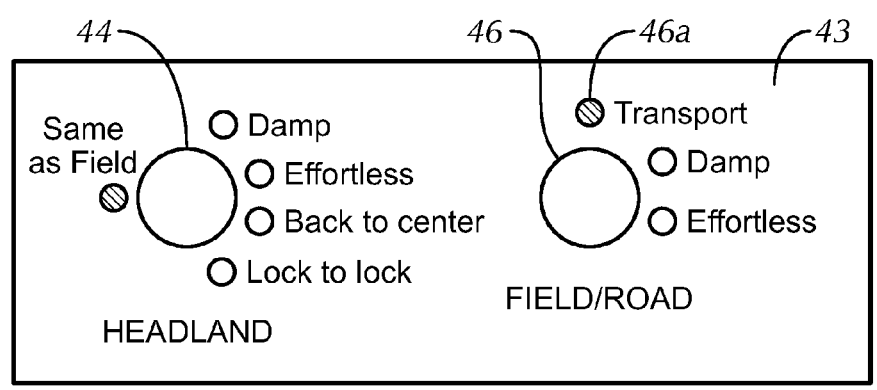
FIG. 5b shows the status of the HMI of FIGS. 2 and 3 at such a time.

While driving on the road the operator of the tractor 20 selects the "FIELD/ROAD" menu of sub-modes by pressing button 46 of HMI 43 as signified in FIG. 5b.

In the illustrated embodiment of the invention this results in the selection of the sub-mode "Transport" that is signified by illumination of indicator lamp 46a.

The "Transport" sub-mode applies steering assistance, using the first and second steering servomechanisms under control of the ECU 41, such that the steering is reactive and self-centring. The aim of the "Transport" sub-mode is to replicate as far as possible in a tractor weighing several tonnes the feeling of steering a passenger car on the road 53. This assists the tractor operator to respond to road situations in a similar manner to the other road users nearby.

Selection of one sub-mode via the HMI 43 inhibits the selection of all other sub-modes, that would as a result need to be selected specifically in order to take effect.

However in the preferred embodiment shown selection of "Transport" mode in particular may occur automatically when the tractor 20 moves on a road. Automatic selection of "Transport" mode may take place for example whenever the forward speed of the tractor exceeds a chosen threshold (such as but not limited to 25 km/h) signifying on-road driving. The ECU 41, that preferably is programmable, may include an algorithm that achieves this effect.

Once the tractor 20 is in the field 54 the operator may as desired use the mode selection button 46 as many times as desired in order to "scroll" the menu of available sub-modes and select the one that most accurately suits the field conditions and the tasks that the tractor must fulfil.

Thus the operator may maintain the selection of the "Transport" sub-mode (for example if the field is relatively smooth and flat, as is often the case in certain types of livestock pasture and fields that are cultivated for forage growing), or he/she may select a "Damp" sub-mode (in which damping of the steering as explained herein is at a maximal level) or an "Effortless" sub-mode in which the effort to rotate the steering wheel is very low, or perhaps even zero.

The "Damp" sub-mode as indicated is particularly suitable when operating in rutted or furrowed ground in which it would otherwise require very considerable effort on the part of the operator to make the tractor 20 maintain a chosen course. Also the "Damp" mode would be suitable if it was necessary to follow a continuously curved course, representing for example a curved field margin.

The effortless sub-mode is suitable for making headland operations faster than would otherwise be the case and with a lower effort required on the part of the vehicle operator.

Figure 6A:
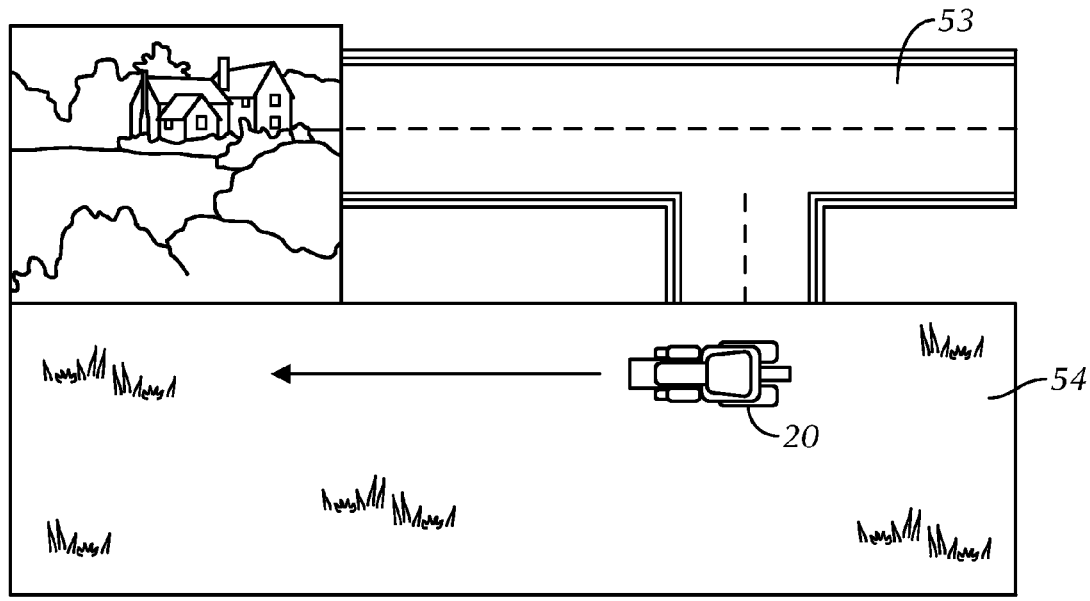
FIG. 6a shows an example of a second manoeuvre (carrying out a task involving passing along the field) that may be performed by the tractor of FIGS. 5a and 5b.
Figure 6B:
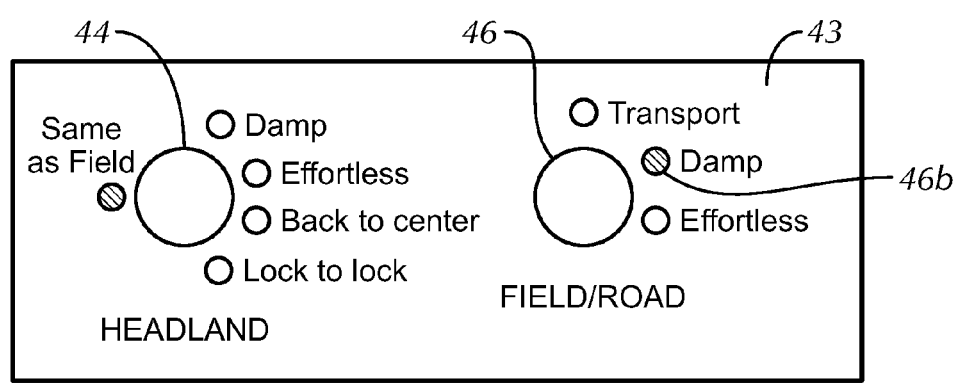
FIG. 6b shows the prevailing status of the HM during the manoeuvre.

FIG. 6b shows the "Damp" sub-mode button 46b illuminated by way of illustration.

While performing operations in a field the operator may in addition select a further operational mode, in which the joystick 49 if fitted to the tractor 20 becomes active as the steering input member. In the illustrative embodiment described selection of this mode may take place through depressing of a button on the joystick 49 itself, but in other embodiments alternative ways of selecting the sub-mode may be available. Examples include but are not limited to use of one or a combination of the mode selection buttons 44, 46 or another button that may also form part of the HMI. Selection of a reverse gear or the activation of a rear-mounted implement may also be used to initiate steering input via the joystick 49.

Figure 7A:
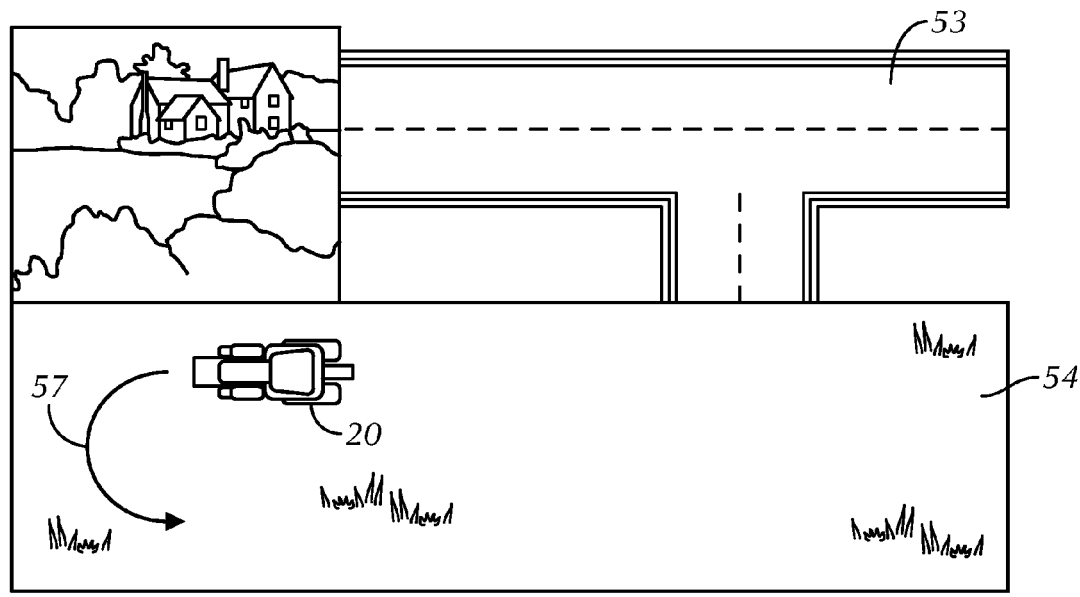
FIGS. 7a and 7c show an example of a third manoeuvre (initiating and completing a headland turn) that may be performed by the tractor.

In FIG. 7a the tractor 20 has temporarily ceased field operations in order to permit turning in a headland 57 at an end of the field 54.

Normally in the headland any implement or other ground-treating accessory of the tractor 20 is deactivated (e.g. by raising of the implement out of engagement with the soil, by closing off seed coulters, by switching off spray pumps and so on). The requirement of the tractor often then becomes one of maximum manoeuvrability in order to allow it to turn as smoothly, safely and quickly as possible in the headland margin.

When entering a headland therefore the operator of the tractor 20 may press the "HEADLAND" mode selection button 44 that in the embodiment shown would result in selection of the first of the headland sub-modes (i.e. "Damp" in the illustrated example).

The "Damp" sub-mode available via the HEADLAND menu may be the same as the "Damp" sub-mode available through pressing the "FIELD/ROAD" mode selection button, or it may result in the operation of a different programme that causes different combinations of the damping effects available from the two steering servomechanisms.

The operator may also select an "Effortless" sub-mode in which the steering becomes as light as possible (i.e. maximum assistance is provided using the two steering servomechanisms); a "Back to centre" sub-mode, in which the self-centring is maximised; and a "Lock-to-lock" mode in which movement of the steering wheel when at one extreme of steering lock causes assisted rotation to the opposite lock setting. This last mentioned mode may be of help for example when the headland is particularly confined.

Figure 7B:
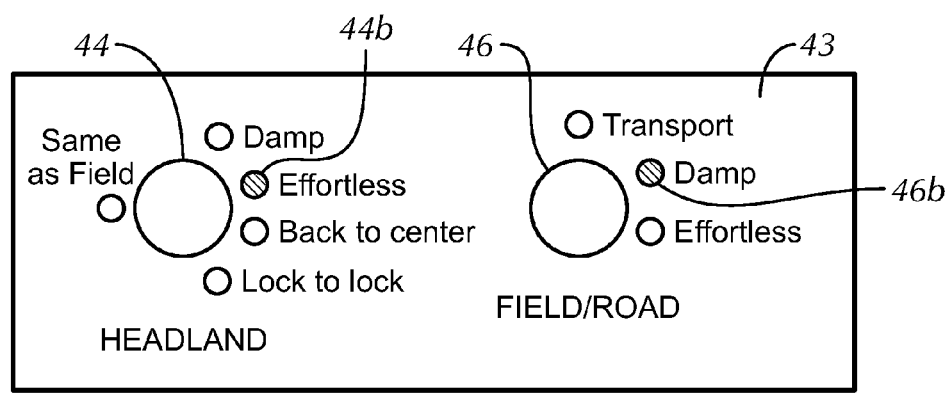
FIGS. 7b and 7d show the statuses of the HMI.

FIG. 7*b* shows the "Effortless" sub-mode indicator lamp in an illuminated state, signifying selection of that sub-mode.

In some tractors and other agricultural vehicles the electronics and/or the software are programmable for the purpose of recording a sequence of control actions. One example of when this is beneficial is when performing a turn in the headland of an essentially rectangular field during operations that rely on use of an implement.

On the occasion of a first turn of this kind that the vehicle makes after entering such a field the tractor operator may press a "PROGRAM" or "RECORD" button before carrying out the headland turn steps (i.e. raising the implement attached to the tractor, selecting a chosen low gear ratio, adjusting the engine governor and operating the steering wheel to perform the turn before re-engaging the implement and selecting the appropriate gear and governor settings for continuing field work). Pressing of the PROGRAM or RECORD button (assuming one is present) causes the vehicle control software to store the sequence of steps so that the headland turns may be reliably performed each time the vehicle reaches an end of the field.

The apparatus and operation of the invention are compatible with such an arrangement and indeed the selection of particular modes and sub-modes as described above may if desired be treated as recordable steps that can form part of a sequence as described above.

Figure 7C:
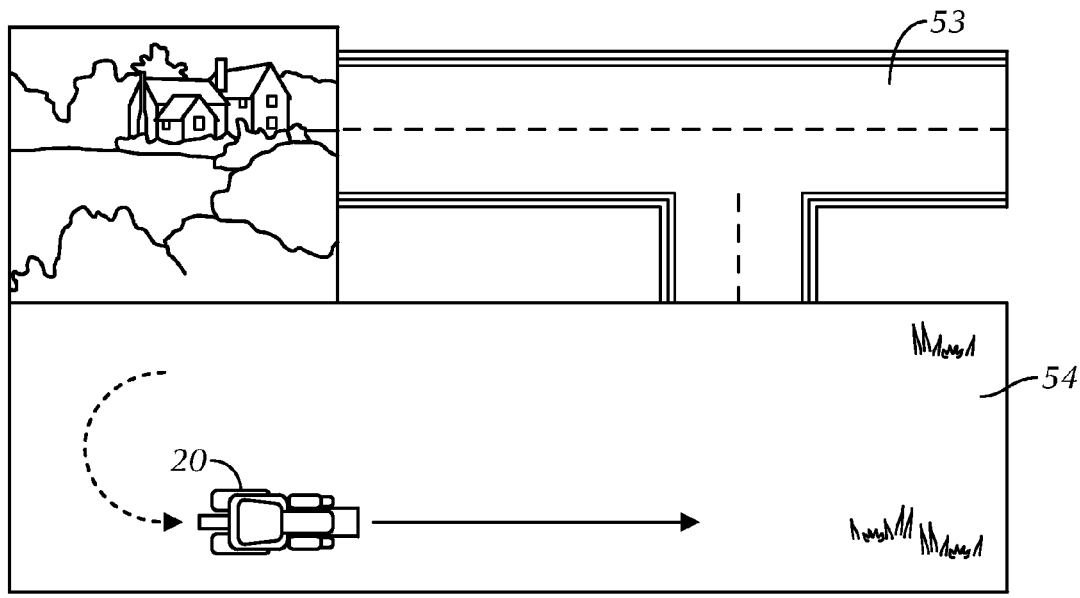
Figure 7D:
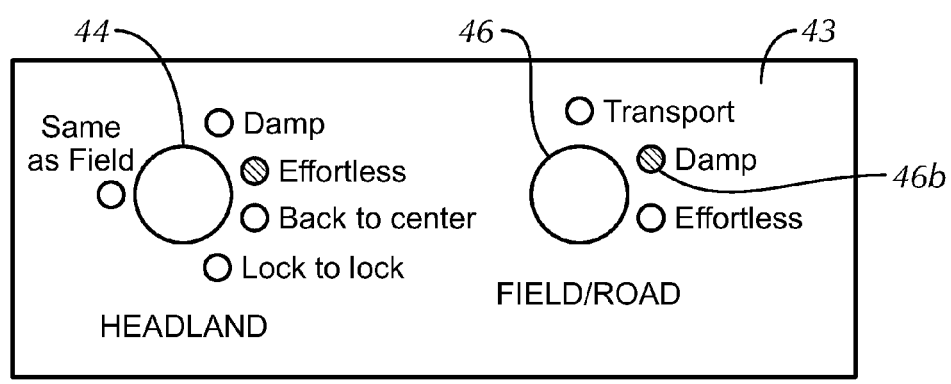

FIG. 7*c* illustrates the tractor 20 resuming field operations after completion of a headland turn. In the preferred embodiment of the invention the tractor operator presses the "FIELD/ROAD" button in order to effect a transition back to the same sub-mode of assistance that prevailed before initiation of the headland turn. Thus in FIG. 7*d* the "Damp" sub-mode indicator lamp 46*b* is illuminated. This lamp 46*b* also may be arranged to flash during the headland turn in order to remind the operator of the sub-mode to which the tractor steering would return following pressing of the mode selection button 46 at the end of the turn.

Figure 8A:
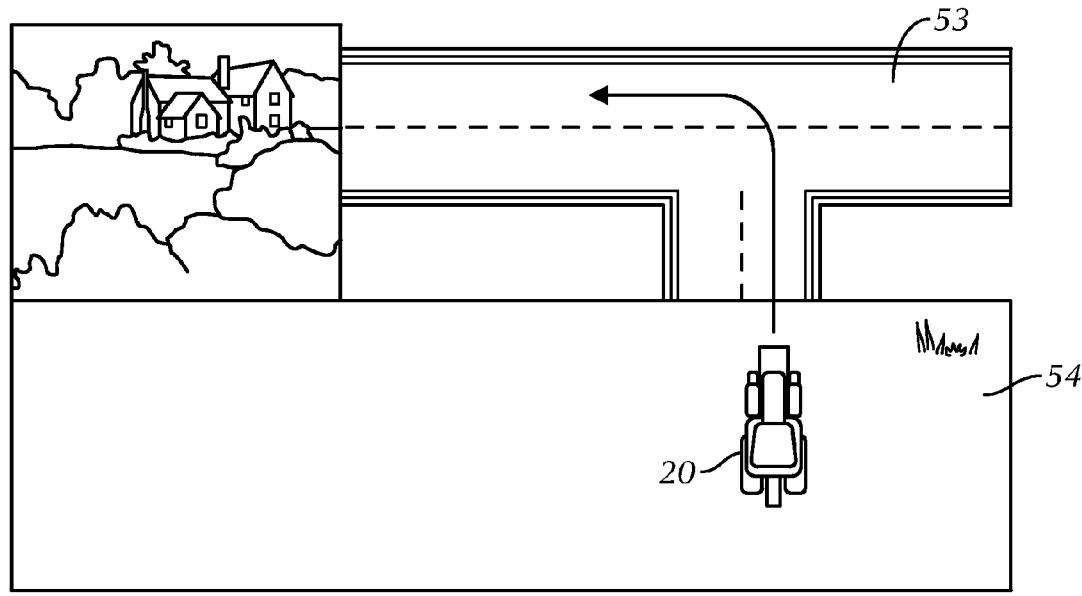
FIG. 8a shows an example of a fourth manoeuvre (returning from the field to a road) that the tractor may complete.
Figure 8B:
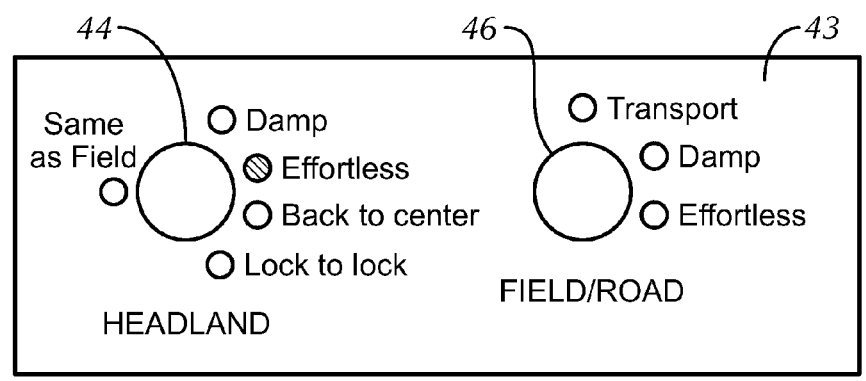
FIG. 8b shows the status of the HMI at such a time.

FIG. 8*a* shows the tractor leaving the field 54 and returning to the road 53 at the end of a period of work. The operator may select the "Transport" sub-mode using the button 46 at this time; or he/she may simply permit automatic selection of this mode to occur as the forward speed of the tractor exceeds the chosen threshold value.

In addition to the foregoing modes, as explained the tractor 20 may be equipped with a so-called "autoguidance" device (such as a Global Positioning System receiver, or another type of receiver of steering and/or navigation signals). Also as explained above such signals may derive from satellites in Earth orbit, other vehicles (such as other tractors working nearby) or even fixed transmitters. When so equipped the tractor 20 may manoeuvre without need for operation of the steering input devices such as steering wheel 23 or joystick 49. Such devices therefore may be dispensed with, although preferably at least the steering wheel 23 would be retained.

The listing or discussion of an apparently prior-published document in this specification should not necessarily be taken as an acknowledgement that the document is part of the state of the art or is common general knowledge.

The invention claimed is:

1. A steerable, self-propelled vehicle including an agricultural tractor, the steerable self-propelled vehicle comprising:
   a steering mechanism having a rotatable steering column that is connected to control a steering angle of one or more ground-engaging members of the vehicle, the vehicle including
      a first steering servomechanism acting on the steering mechanism in a first location, the first steering servomechanism including a hydraulic steering servomechanism including a hydraulic steering valve that generates a pilot hydraulic signal in relation to the rotational angle of the steering column and at least one hydraulic steering cylinder connected to adjust the steering angle of the one or more ground-engaging members, the pilot hydraulic signal being piloted to control the hydraulic steering cylinder, the first steering servomechanism having at least a first steering assistance characteristic;
      a second steering servomechanism acting on the steering mechanism in a second location, the second steering servomechanism including an electric power steering servomechanism including a motor for generating a torque that acts on the steering column, and a signal generator for generating control signals determining the magnitude and direction of action of the torque, the second servo mechanism having a second steering assistance characteristic; and
      a programmable controller for causing the first and second steering assistance characteristics to influence the steering of the vehicle in dependence on one or more control commands generated in the controller,
   wherein the vehicle includes a human-machine interface (HMI) using which a driver may input commands selecting two or more programmed modes of operation of the steering servomechanisms,
   wherein the HMI includes switching interfaces for selecting between programmed modes that control steering during movement of the tractor respectively in a field headland and in other locations,
   wherein the HMI includes respective switches for selecting the programmed modes and sequentially selecting sub-modes following selection of a said programmed mode, and
   wherein the sub-modes available following selection of headland operation include a damped steering sub-mode, a maximal assistance sub-mode, an automatic steering centring sub-mode, and a lock-to-lock assistance sub-mode, and the sub-modes available following selection of other location operation include an on-road sub-mode, a damped steering sub-mode, and a maximal assistance sub-mode.

2. A steerable, self-propelled vehicle according to claim 1 that is driver-operated and includes one or more steering input members operatively connected to the steering column, wherein the controller generates control commands in dependence on one or more driver inputs via at least one steering input member.

3. A steerable, self-propelled vehicle according to claim 1 wherein the other locations include fields and roads.

4. A steerable, self-propelled vehicle according to claim 1 including two or more selectively operable steering input members connected to the steering column that include a steering wheel and a joystick.

5. A steerable, self-propelled vehicle according to claim 4 wherein the steering wheel is mechanically coupled to the steering column.

6. A steerable, self-propelled vehicle according to claim 4 wherein the joystick is electronically coupled to the second steering servomechanism.

7. A steerable, self-propelled vehicle according to claim 1 including at least one receiver of transmitted vehicle guidance signals and at least one controller that converts received guidance signals to steering input commands that are input to the first steering servomechanism and/or the second steering servomechanism.

8. A steerable, self-propelled vehicle according to claim 1 wherein the amount of steering assistance is adjustable depending on at least one of the following signals:
- vehicle speed or wheel speed;
- steering wheel angle;
- electric motor position;
- joystick position;
- steerable wheel alignment angle;
- torque on the steering column;
- hydraulic pressure in one or more hydraulic steering cylinder(s);
- driver input torque on the steering wheel;
- electric motor supply current or voltage.

* * * * *